US012746750B2

(12) United States Patent
Byun et al.

(10) Patent No.: US 12,746,750 B2
(45) Date of Patent: Sep. 29, 2026

(54) INKJET PRINTHEAD

(71) Applicant: ENJET CO. LTD., Suwon-si (KR)

(72) Inventors: Do Young Byun, Seoul (KR); Byungjik Lim, Suwon-si (KR); Shaheer Mohiuddin Khalil, Suwon-si (KR); Baek Hoon Seong, Hwaseong-si (KR); Jaewoo Joung, Seongnam-si (KR); Jaeyong Choi, Suwon-si (KR)

(73) Assignee: Enjet Co. Ltd., Suwon-si (KR)

( * ) Notice: Subject to any disclaimer, the term of this patent is extended or adjusted under 35 U.S.C. 154(b) by 187 days.

(21) Appl. No.: 18/391,753

(22) Filed: Dec. 21, 2023

(65) Prior Publication Data

US 2024/0208213 A1 Jun. 27, 2024

(30) Foreign Application Priority Data

Dec. 22, 2022 (KR) ........................ 10-2022-0181558
Dec. 15, 2023 (KR) ........................ 10-2023-0182683

(51) Int. Cl.
*B41J 2/06* (2006.01)
*B41J 2/085* (2006.01)
*B41J 2/14* (2006.01)

(52) U.S. Cl.
CPC ................. *B41J 2/06* (2013.01); *B41J 2/085* (2013.01); *B41J 2/14* (2013.01)

(58) Field of Classification Search
CPC ....... B41J 2/06; B41J 2/085; B41J 2/14; B41J 2/14233
See application file for complete search history.

(56) References Cited

U.S. PATENT DOCUMENTS

2007/0013750 A1* 1/2007 Furukawa .................. B41J 2/06 347/78
2007/0024669 A1* 2/2007 Sugahara ................... B41J 2/04 347/45
2016/0279939 A1 9/2016 Arae et al.
(Continued)

FOREIGN PATENT DOCUMENTS

JP 2007-21752 A 2/2007
JP 2007-30217 A 2/2007
JP 2011-73189 A 4/2011
(Continued)

OTHER PUBLICATIONS

Office Action dated Oct. 15, 2024 in Japanese Application No. 2023-215076.
(Continued)

*Primary Examiner* — Ricardo I Magallanes
*Assistant Examiner* — Tracey M McMillion
(74) *Attorney, Agent, or Firm* — SALIWANCHIK, LLOYD & EISENSCHENK

(57) ABSTRACT

Disclosed is an inkjet printhead. The inkjet printhead with a plurality of nozzles to eject a liquid solution by an electrohydrodynamic method includes: a first electrode formed for each of the plurality of nozzles and applied with a voltage for ejecting the liquid solution by the electrohydrodynamic method; a first voltage controller configured to apply the voltage to the first electrode; and a second electrode placed between and spaced apart from the first electrodes formed in the nozzles and grounded to inhibit electric field interference between the nozzles.

9 Claims, 9 Drawing Sheets

(56) References Cited

U.S. PATENT DOCUMENTS

| | | | |
|---|---|---|---|
| 2021/0070043 | A1 | 3/2021 | Tse et al. |
| 2022/0363059 | A1 | 11/2022 | Galliker |

FOREIGN PATENT DOCUMENTS

| | | | | |
|---|---|---|---|---|
| JP | 2013-256001 | A | 12/2013 | |
| JP | 2016-185598 | A | 10/2016 | |
| KR | 10-1310759 | B1 | 9/2013 | |
| KR | 10-2020-0122228 | A | 10/2020 | |
| WO | WO-2021257998 | A1 * | 12/2021 | .............. B41J 2/185 |

OTHER PUBLICATIONS

European Search Report dated May 22, 2024 in European Application No. 23217809.5.

Office Action dated Jan. 29, 2026 in Chinese Application No. 202311757937.9.

Office Action dated Feb. 25, 2026 in Korean Application No. 10-2023-0182683.

* cited by examiner

INKJET PRINTHEAD

CROSS-REFERENCE TO RELATED APPLICATIONS

This application claims the benefit of Korean Patent Application No. 10-2022-0181558, filed on Dec. 22, 2022 and Korean Patent Application No. 10-2023-0182683, filed on Dec. 15, 2023, the disclosures of which are incorporated herein by reference.

BACKGROUND OF THE INVENTION

(a) Field of the Invention

The disclosure relates to an inkjet printhead, and more particularly to an inkjet printhead that has multiple nozzles and ejects a liquid solution by an electrohydrodynamic method.

(b) Description of the Related Art

In general, an inkjet printhead refers to a device that prints an image with predetermined colors on a surface of a printing medium by ejecting fine droplets of ink to a desired position on the printing medium. The applications of the inkjet printhead have recently expanded to various fields such as a liquid crystal display (LCD), an organic light emitting device (OLED) and other flat panel display fields; electronic (E)-paper and other flexible display fields; metal wiring and other printed electronics fields; bio fields; and so on.

Drop-on-demand (DOD) inkjet printhead is classified according to the ejecting method. A piezoelectric inkjet printhead ejects ink by pressure waves based on transformation of a piezoelectric body, and an electrohydrodynamic inkjet printhead ejects ink by electrostatic force.

In the piezoelectric inkjet printhead, a piezoelectric body vibrates a membrane to apply pressure to a chamber containing ink, thereby ejecting the ink. In general, droplets are ejected when pressure is high enough to overcome the surface tension and viscosity of the ink on the surface of a nozzle and additionally applied pressure is required to be high enough to accelerate the ejected droplets to a speed at which these droplets can be accurately settled on a printing medium. To discharge a droplet of several picoliters or less, the piezoelectric inkjet printhead needs to reduce transformation energy in a pressure chamber. When the transformation energy in the pressure chamber is reduced, ejecting energy per unit volume of the ejected droplets is also reduced, and therefore a ejecting speed of the droplets is decreased. However, when the ejecting speed of the droplets is decreased, a problem arises in that the droplets are not accurately ejected to desired positions.

The piezoelectric inkjet printhead is advantageous in that it is easy to control a printing job, and there are no restrictions on the types of ink because the ejecting energy is based on mechanical transformation. However, the piezoelectric inkjet printhead has difficulty in ejecting ultrafine droplets of several picoliters or less and has a limitation in that the discharge of only ink having a viscosity of about 10 cPs is possible but the discharge of ink having a high viscosity is not possible. Further, it is difficult to discharge big droplets of 80 picoliters or more due to the limitations on the ejecting energy. In particular, the piezoelectric inkjet printhead has a limitation even though volume uniformity of ejected droplets between a plurality of nozzles is very important for applications to the processes of the printed electronics such as a display, etc. unlike the existing graphic printing.

On the other hand, the electrohydrodynamic inkjet printhead provides the ejecting energy by applying electrostatic force to a liquid surface of ink formed at the end of a nozzle, and is therefore advantageous in that the discharge of ultrafine droplets of not more than several picoliters or femtoliters is possible and the discharge of ink droplets having a high viscosity of about 1,000 cPs is possible. Besides, it is also possible to discharge big droplets of 80 picoliters or more. The electrohydrodynamic inkjet printhead is advantageous for precise printing because a driving method is simple and the directionality of ejected ink droplets is excellent due to control based on distribution of an electric field formed on the nozzle.

However, when the multiple nozzles are formed in the electrohydrodynamic inkjet printhead, the size of droplets ejected through the plurality of nozzles is not uniform due to electric field interference between neighboring nozzles, thereby causing a problem of poor print quality.

DOCUMENT OF RELATED ART

Patent Document

Korean Patent No. 1310759

SUMMARY OF THE INVENTION

Accordingly, the disclosure has been conceived to solve the foregoing problems, and an aspect of the disclosure is to provide an inkjet printhead that has a plurality of nozzles and ejects a droplet by an electrohydrodynamic method, in which a grounded second electrode is placed between and spaced apart from first electrodes formed in nozzles for ejecting the droplet by the electrohydrodynamic method, thereby inhibiting electric field interference between the nozzles.

The problems to be solved by the disclosure are not limited to those mentioned above, and other unmentioned problems will become apparent to a person skilled in the art by the following descriptions.

In accordance with an embodiment of the disclosure, there is provided an inkjet printhead with a plurality of nozzles to eject a liquid solution by an electrohydrodynamic method, the inkjet printhead including: a first electrode formed for each of the plurality of nozzles and applied with a voltage for ejecting the liquid solution by the electrohydrodynamic method; a first voltage controller configured to apply the voltage to the first electrode; and a second electrode placed between and spaced apart from the first electrodes formed in the nozzles and grounded to inhibit electric field interference between the nozzles.

Here, the inkjet printhead may further include a nozzle layer formed with a plurality of nozzle chambers to store ink supplied for each nozzle and a nozzle hole on a bottom of the nozzle chamber to eject a liquid solution, wherein the first electrode is formed on an inner surface of the nozzle chamber, and the second electrode is formed on a top surface of the nozzle layer.

Here, a distance between the first electrode and the second electrode may be greater than a distance between a bottom of the nozzle and a subject.

Here, the inkjet printhead may further include a nozzle layer formed with a plurality of nozzle chambers to store ink supplied for each nozzle and a nozzle hole on a bottom of the nozzle chamber to eject a liquid solution, wherein a groove is recessed downwards on a top surface of the nozzle layer, and the second electrode is formed inside the groove.

Here, the inkjet printhead may further include a blocking unit formed of an insulator and covering the groove to block the second electrode from being exposed to an outside of the groove.

Here, the inkjet printhead may further include a nozzle layer formed with a plurality of nozzle chambers to store ink supplied for each nozzle and a nozzle hole on a bottom of the nozzle chamber to eject a liquid solution, wherein the first electrode is formed on an inner surface of the nozzle chamber, and the second electrode is formed on a bottom surface of the nozzle layer.

Here, a bottom of the nozzle layer may protrude to form a protruding portion for each nozzle, a nozzle hole may be formed at a bottom of the protruding portion, and the second electrode may be formed on a recessed portion between the protruding portions.

Here, a distance between a bottom of the nozzle and the second electrode may be greater than a distance between the bottom of the nozzle and a subject.

Here, the inkjet printhead may further include a nozzle layer formed with a plurality of nozzle chambers to store ink supplied for each nozzle and a nozzle hole on a bottom of the nozzle chamber to eject a liquid solution, wherein a groove is recessed upwards on a bottom surface of the nozzle layer, and the second electrode is formed inside the groove.

Here, the inkjet printhead may further include a blocking unit formed of an insulator and covering the groove to block the second electrode from being exposed to an outside of the groove.

Here, the inkjet printhead may further include: a nozzle layer formed with a plurality of nozzle chambers to store ink supplied for each nozzle and a nozzle hole on a bottom of the nozzle chamber to eject a liquid solution; and a spacing layer placed on the nozzle layer and formed with a channel penetrated to communicate with the nozzle chamber, wherein the first electrode is formed on an inner surface of the nozzle chamber, and the second electrode is formed on a top surface of the spacing layer.

Here, the second electrode may be formed on a bottom surface of the nozzle layer.

Here, the inkjet printhead may further include: a nozzle layer formed with a plurality of nozzle chambers to store ink supplied for each nozzle and a nozzle hole on a bottom of the nozzle chamber to eject a liquid solution; and a spacing layer placed on the nozzle layer and formed with a channel penetrated to communicate with the nozzle chamber, wherein a groove is recessed downwards on a top surface of the spacing layer, and the second electrode is formed inside the groove.

Here, the inkjet printhead may further include a blocking unit formed of an insulator and covering the groove to block the second electrode from being exposed to an outside of the groove.

Here, the nozzle layer may include: a first nozzle layer formed with a plurality of nozzle chambers to store ink supplied for each nozzle and a nozzle hole on a bottom of the nozzle chamber to eject a liquid solution, and including a first electrode formed on an inner surface of the nozzle chamber; and a second nozzle layer formed on the first nozzle layer, formed with a plurality of communication chambers communicating with the nozzle chambers, and including a third electrode formed on an inner surface of the communication chamber and receiving a voltage for ejecting a liquid solution by an electrohydrodynamic method.

Here, the plurality of nozzles may be arranged in a matrix form, the first electrodes arranged in one direction between a row direction and a column direction may be electrically connected, and the first voltage controller may selectively and simultaneously apply voltage to the first electrodes arranged in the one direction, and the third electrodes arranged in the other direction between the row direction and the column direction may be electrically connected, and the second voltage controller may selectively and simultaneously applies voltage to the first electrodes arranged in the other direction.

In accordance with an embodiment of the disclosure, there is provided an inkjet printhead with a plurality of nozzles to eject a liquid solution by an electrohydrodynamic method, the inkjet printhead including: a first electrode formed for each of the plurality of nozzles, and applied with a voltage for ejecting the liquid solution by the electrohydrodynamic method or connected to ground; a first voltage controller configured to apply the voltage to the first electrode; and a controller configured to control the first electrode to be connected to ground or applied with the voltage from the first voltage controller, wherein, upon ejecting the liquid solution selectively from among the plurality of nozzles, the controller controls the first electrode of the nozzle, which is selected to eject the liquid solution, to be connected to the first voltage controller and applied with the voltage from the first voltage controller, and controls the first electrode of the nozzle, which is adjacent to the nozzle selected to eject the liquid solution and is selected not to eject the liquid solution, to be connected to ground.

Here, upon ejecting the liquid solution selectively from among the plurality of nozzles, the controller controls the first electrode of the nozzle, which is selected to eject the liquid solution, to be connected to the first voltage controller and applied with the voltage from the first voltage controller, and controls the first electrodes of the other nozzles, which are selected not to eject the liquid solution, to be connected to ground.

Here, the inkjet printhead may further include a nozzle layer formed with a plurality of nozzle chambers to store ink supplied for each nozzle and a nozzle hole on a bottom of the nozzle chamber to eject a liquid solution, wherein the first electrode is formed on an inner surface of the nozzle chamber.

Here, a distance between the first electrodes of the neighboring nozzles may be greater than a distance between a bottom of the nozzle and a subject

DETAILED DESCRIPTION

Specific features of embodiments are involved in the detailed description and the accompanying drawings.

The merits and features of the disclosure, and methods of achieving them will become apparent with reference to the embodiments described below in detail and the accompanying drawings. However, the disclosure is not limited to the embodiments set forth herein, but may be implemented in various forms. The following embodiments are provided in order to fully describe the disclosure and enable those skilled in the art, to which the disclosure pertains, to understand the disclosure, the scope of which is defined in the appended claims. Like numerals refer to like elements throughout.

Below, an inkjet printhead according to embodiments of the disclosure will be described with reference to the accompanying drawings.

Figure 1:
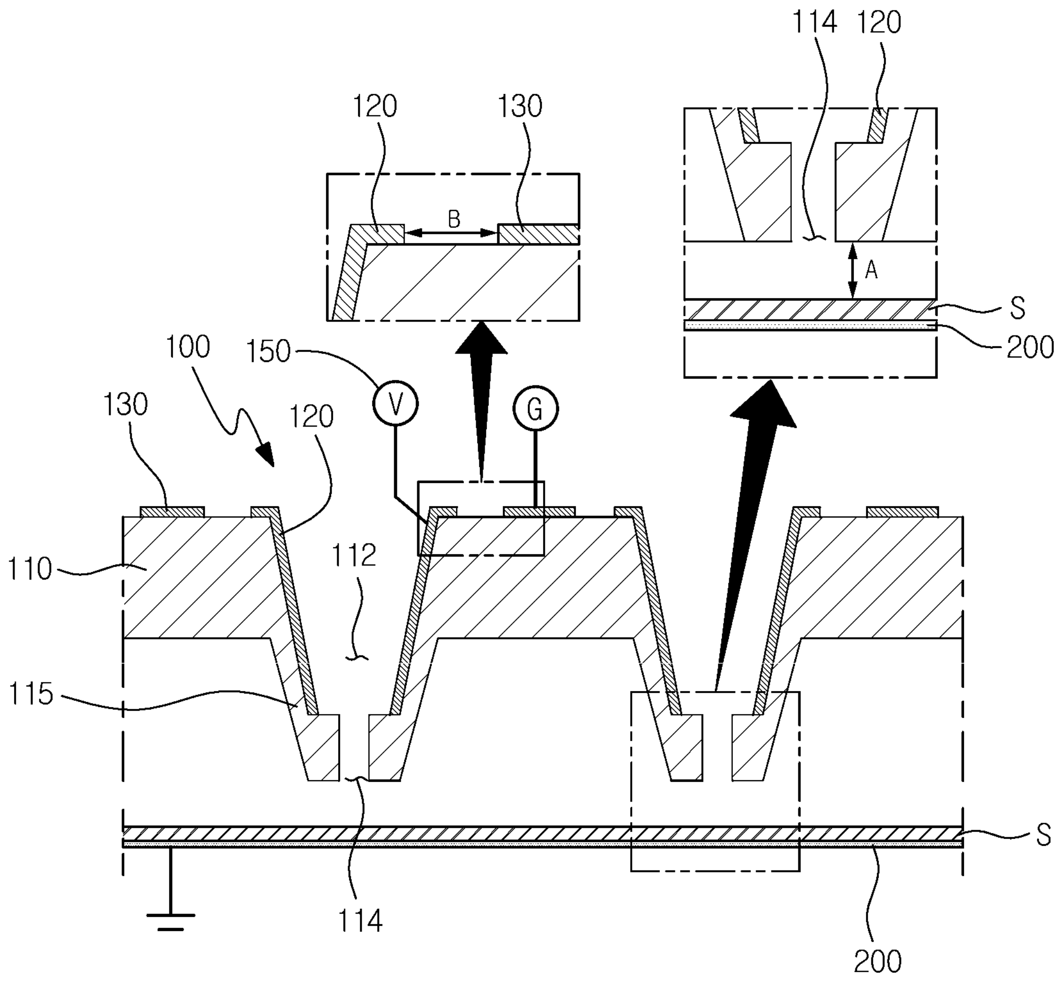
FIG. 1 is a view showing a schematic structure of a printhead according to a first embodiment of the disclosure.

FIG. 1 is a view showing a schematic structure of a printhead according to a first embodiment of the disclosure.

An inkjet printhead according to the first embodiment of the disclosure Includes a plurality of nozzles 100, and each nozzle 100 ejects a liquid solution based on electrostatic force by an electrohydrodynamic method. In the accompanying drawings, two nozzles 100 are shown on the left and right in a horizontal direction, but this is for illustrative purposes only. Thus, a large number of nozzles 100 may be provided in the inkjet printhead. Further, the plurality of nozzles 100 may be provided in the form of a matrix as arranged in the front and back directions of the drawings.

The plurality of nozzles 100 may be formed in a nozzle layer 110. In the nozzle layer 110, a plurality of nozzle chambers 112, in which ink supplied from the outside is stored, are spaced from each other, and a nozzle hole 114, through which a liquid solution is ejected, is formed at the bottom of the nozzle chamber 112. In this case, as shown, the nozzle chamber 112 may be, shaped like, but not limited to, a truncated cone with a slope on the inside thereof, and thus have a cross-section tapering toward the bottom. Alternatively, the nozzle chamber 112 may be shaped like a cylinder or ellipse.

Regarding each nozzle 100, the bottom of the nozzle layer 110 may protrude to form a protruding portion 115, and the nozzle hole 114 may be formed at the bottom of the protruding portion 115.

A first electrode 120 is placed for each of the plurality of nozzles 100, and a voltage for ejecting the liquid solution by the electrohydrodynamic method is applied to the first electrode 120. As shown, the first electrode 120 may be formed on an inner surface of the nozzle chamber 112. The first electrode 120 in the accompanying drawings is formed throughout the inner surface of the nozzle chamber 112, but may be formed partially. Further, the upper end of the first electrode 120 may be formed partially extending on the top surface of the nozzle layer 110.

The first electrode 120 may be coated with an insulating layer (not shown). The first electrode 120 coated with the insulating layer may cause the liquid solution introduced into the nozzle chamber 112 to be polarized by induced voltage and charged when voltage is applied to the first electrode 120, so that the liquid solution can be ejected to the outside through the nozzle hole 114 by the force of an electric field formed by the first electrode 120.

The first electrode 120 may be formed individually for each nozzle 100. Alternatively, the first electrode 120 may be formed integrally with the plurality of nozzles 100. Further, the first electrode 120 may be formed integrally with the plurality of nozzles 100 arranged in single file in a row or column direction (to be described later with reference to FIGS. 7 to 8).

A first voltage controller 150 applies the voltage to the first electrode 120 in order to eject the liquid solution by the electrohydrodynamic method.

Under a subject S to print on, a ground electrode 200, to which voltage having polarity opposite to that of the voltage applied to the first electrode 120 is applied or a ground voltage is applied, may be formed. Further, the ground electrode 200 may not be electrically connected and left as an open terminal. Besides, the ground electrode 200 may be omitted. The ground electrode 200 causes a potential difference from the first electrode 120, so that the electric field for the ejection based on the electrohydrodynamic method can be more uniformly formed between the nozzle 100 and the subject S.

A second electrode 130 is formed between and spaced apart from the first electrodes 120 respectively formed in the nozzles 100, and grounded. By placing the grounded second electrode 130 between the nozzles 100, electric field interference between the neighboring nozzles 100 is minimized.

In this case, the second electrode 130 according to this embodiment may be formed between the nozzles 100 on the top surface of the nozzle layer 110 at a position spaced apart from the first electrode 120.

In this case, as shown in the enlarged views of FIG. 1, a distance B between the first electrode 120 and the second electrode 130 may be greater than a distance A between the bottom of the nozzle 100 and the subject S. Thus, the electric field interference between the neighboring nozzles 100 is minimized, so that each nozzle 100 can be individually controlled to eject the liquid solution. If the distance B between the first electrode 120 and the second electrode 130 is smaller than the distance A between the bottom of the nozzle 100 and the subject S, the electric field generated in the first electrode 120 of one nozzle 100 has a greater effect on the neighboring nozzles 100 than on ejecting droplets toward a target substrate, thereby making it difficult to individually control each nozzle 100 to eject the liquid solution. Of course, for the individual control, the first electrode 120 is required to be formed not integrally but individually with respect to the plurality of nozzles 100. Here, the distance B between the first electrode 120 and the second electrode 130 may refer to the minimum distance between the end of the first electrode 120 and the end of the second electrode 130.

Because the distance B between the first electrode 120 and the second electrode 130 is fixed when manufactured, the distance A between the bottom of the nozzle 100 and the subject S may be controlled within a range smaller than the distance B when the printing is performed using the inkjet printhead according to this embodiment.

For reference, while FIG. 1 shows that only one first electrode 120 among the plurality of first electrodes 120 is connected to the first voltage controller 150, in practice all the first electrodes 120 are connected to the first voltage controllers 150, respectively. In addition, while FIG. 1 shows that only one second electrode 130 is connected to ground, in practice all the second electrodes 130 are connected to ground. The same is applied to the other drawings to which the description will be made with reference.

Figure 2:
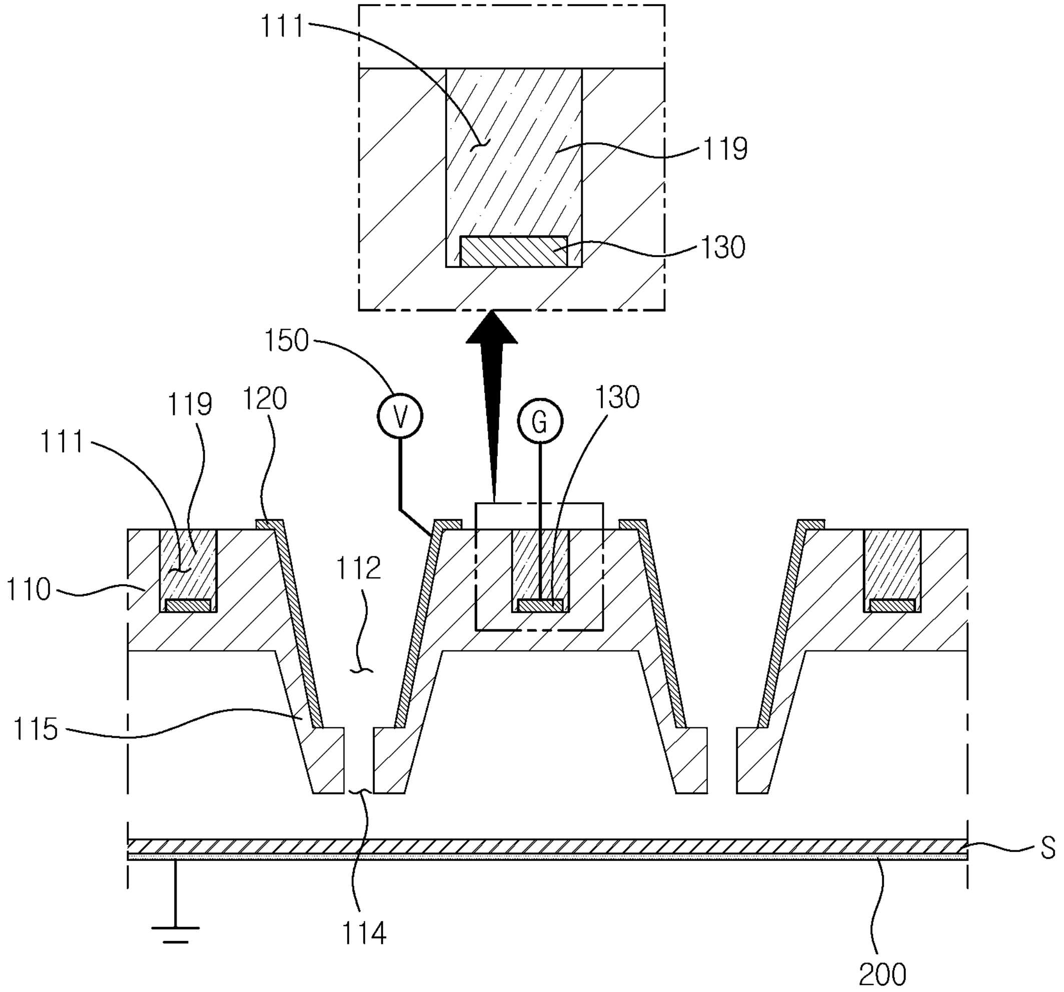
FIG. 2 is a view showing a schematic structure of a printhead according to a second embodiment of the disclosure.

FIG. 2 is a view showing a schematic structure of a printhead according to a second embodiment of the disclosure.

Below, descriptions will be made focusing on differences from the foregoing embodiment of FIG. 1

In this embodiment, the nozzle layer 110 and the first electrode 120 have the same shape and structure as those of the foregoing embodiment.

In this embodiment, a groove 111 recessed downwards on the top surface of the nozzle layer 110 may be formed between the nozzles 100. The groove 111 may be formed to have a length greater than a width, but is not necessarily limited thereto.

In this case, the grounded second electrode 130 may be formed inside the groove 111. Further, a blocking unit 119 may be additionally formed to cover the groove 111 and block the second electrode 130 from being exposed to the outside of the groove 111 after forming the second electrode 130 inside the groove 111. The blocking unit 119 may be formed of an insulator.

With this structure that the grounded second electrode 130 is formed inside the groove 111 covered with the insulator, the electric field interference between the neighboring nozzles 100 is minimized.

Figure 3:
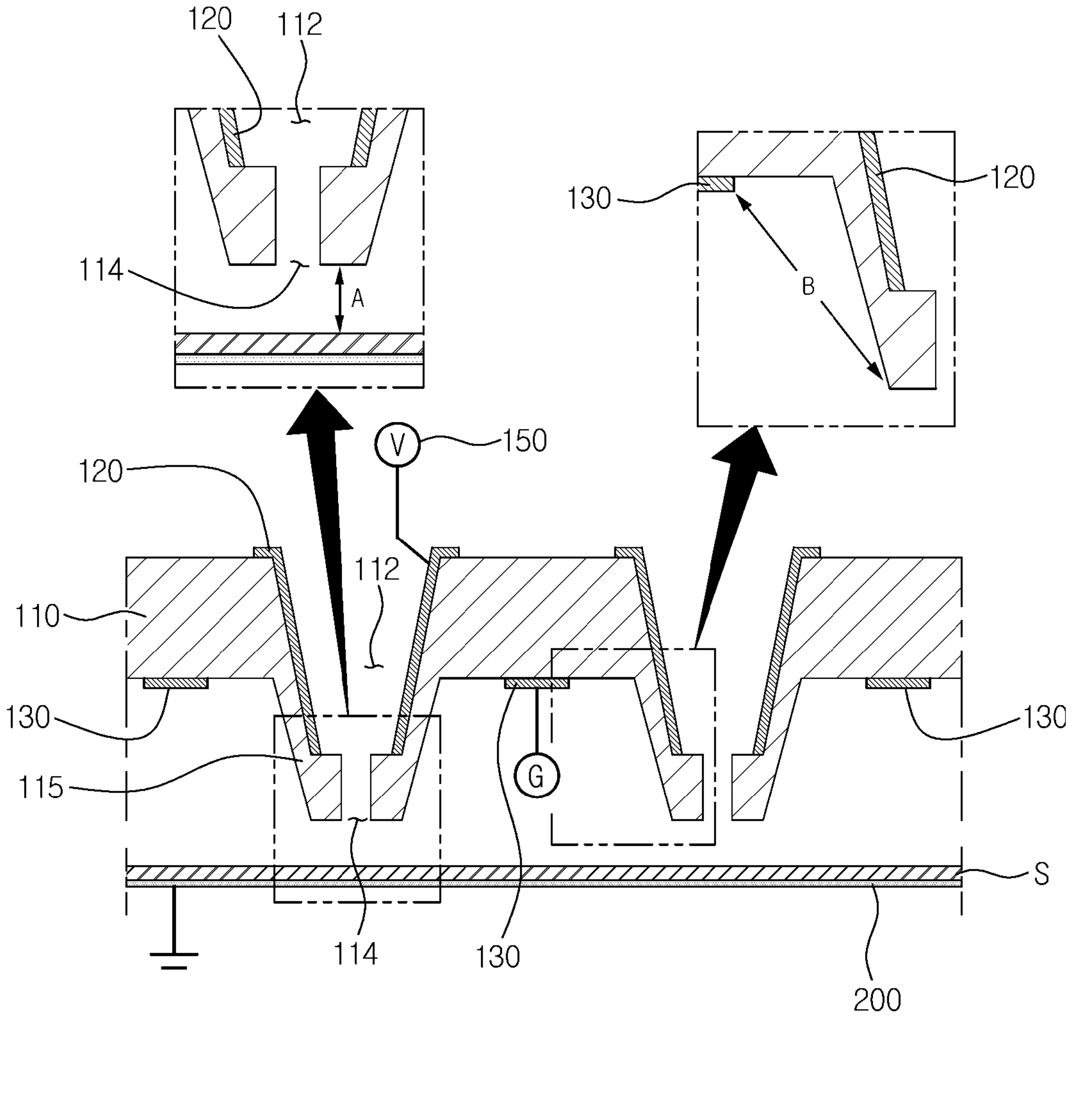
FIG. 3 is a view showing a schematic structure of a printhead according to a third embodiment of the disclosure.

FIG. 3 is a view showing a schematic structure of a printhead according to a third embodiment of the disclosure.

Below, descriptions will be made focusing on differences from the foregoing embodiment of FIG. 1

In this embodiment, the nozzle layer 110 and the first electrode 120 have the same shape and structure as those of the foregoing embodiment.

In this embodiment, the second electrode 130 may be formed between the nozzles 100 on the bottom surface of the nozzle layer 110. In this case, the second electrode 130 may be formed on a recessed portion between the protruding portions 115 because the protruding portion 115 for each nozzle 100 is formed on the bottom of the nozzle layer 110 as described above.

In this embodiment, a distance B between the bottom of the nozzle 100 and the second electrode 130 may be greater than a distance A between the bottom of the nozzle 100 and the subject S. In this case, the electric field interference between the neighboring nozzles 100 is minimized, so that each nozzle 100 can be individually controlled to eject the liquid solution without wetting. On the other hand, if the distance B between the bottom of the nozzle 100 and the second electrode 130 is smaller than the distance A between the bottom of the nozzle 100 and the subject S, it is difficult to individually control each nozzle 100 to eject the liquid solution, and wetting may occur. Here, the distance B between the bottom of the nozzle 100 and the second electrode 130 may refer to the minimum distance between the end of the second electrode 130 and the bottom of the nozzle 100.

Even in this embodiment, because the distance B between the bottom of the nozzle 100 and the second electrode 130 is fixed when manufactured, the distance A between the bottom of the nozzle 100 and the subject S may be controlled within a range smaller than the distance B when the printing is performed using the inkjet printhead according to this embodiment.

Although not shown, a groove 111 recessed upwards on the bottom surface of the nozzle layer 110 may be formed like that described above with reference to FIG. 2, and the second electrode 130 may be formed inside the groove 111. Likewise, the groove 111 may be covered with the insulator, i.e., the blocking unit 119, thereby inhibiting the second electrode 130 from being exposed to the outside.

Figure 4:
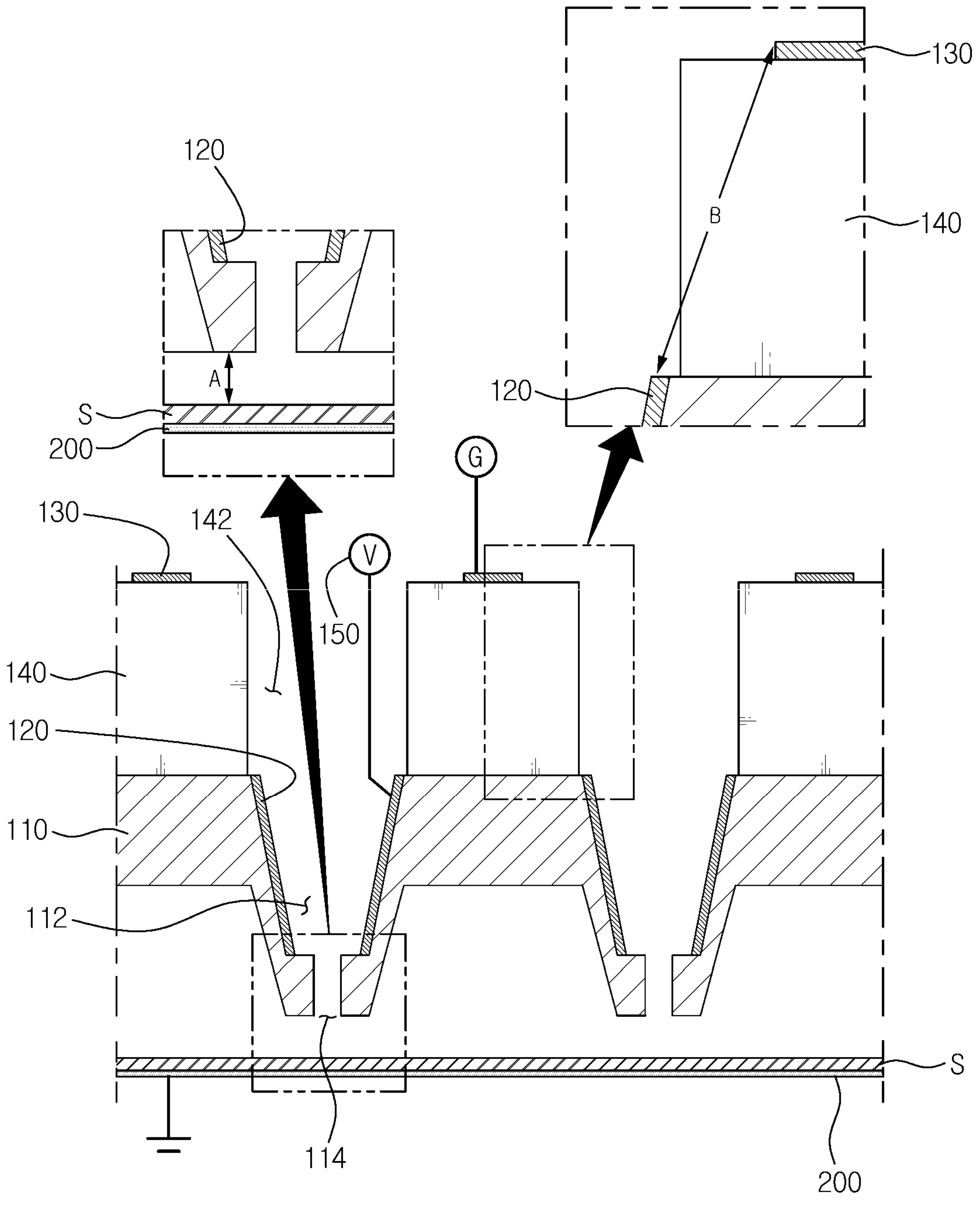
FIG. 4 is a view showing a schematic structure of a printhead according to a fourth embodiment of the disclosure.

FIG. 4 is a view showing a schematic structure of a printhead according to a fourth embodiment of the disclosure.

Below, descriptions will be made focusing on differences from the foregoing embodiment of FIG. 1.

In this embodiment, the nozzle layer 110 and the first electrode 120 have the same shape and structure as those of the foregoing embodiment.

In this embodiment, a spacing layer 140 may be added onto the nozzle layer 110. The spacing layer 140 is placed on the nozzle layer 110, and formed with a channel 142 penetrated to communicate with the nozzle chamber 112. The first electrode 120 is not formed in the channel 142. The spacing layer 140 may be formed of a wafer having a predetermined thickness.

In this case, the grounded second electrode 130 may be formed on the top surface of the spacing layer 140. With this second electrode 130, the electric field interference between the neighboring nozzles 100 is inhibited.

In this embodiment, the spacing layer 140 keeps the distance B between the first electrode 120 and the second electrode 130 longer than that of the first embodiment, and thus the distance A between the bottom of the nozzle 100 and the subject S can be kept longer, thereby performing the printing through individual control.

Although not shown, a groove 111 recessed downwards on the top surface of the spacing layer 140 may be formed like that described above with reference to FIG. 2, and the second electrode 130 may be formed inside the groove 111. Likewise, the groove 111 may be covered with the insulator, i.e., the blocking unit 119, thereby inhibiting the second electrode 130 from being exposed to the outside.

Figure 5:
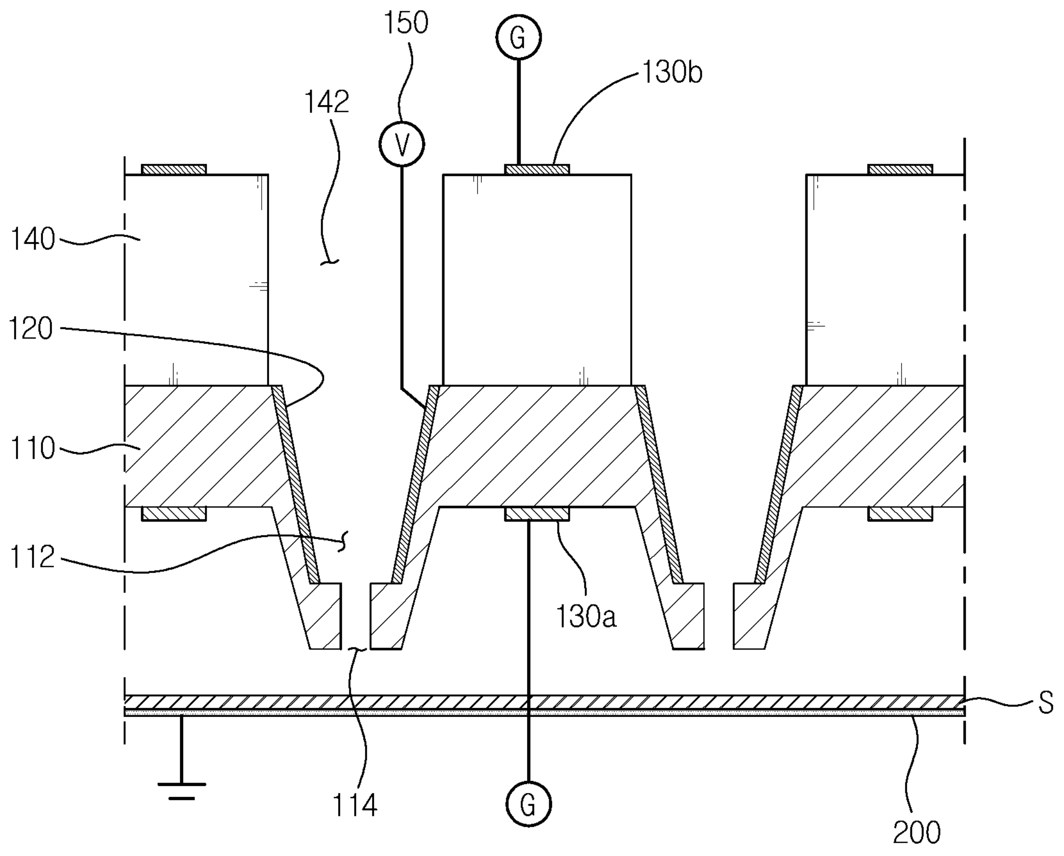
FIG. 5 is a view showing a schematic structure of a printhead according to a fifth embodiment of the disclosure.

FIG. 5 is a view showing a schematic structure of a printhead according to a fifth embodiment of the disclosure.

Below, descriptions will be made focusing on differences from the foregoing embodiments of FIGS. 1 to 4.

In this embodiment, the nozzle layer 110 and the first electrode 120 have the same shape and structure as those of the foregoing embodiment. Further, this embodiment is the same as the embodiment described above with reference to FIG. 4 in that the spacing layer 140 is formed on the nozzle layer 110 and the second electrode 130 is formed on the top surface of the spacing layer 140. However, unlike the embodiment of FIG. 4, the grounded second electrode 130 in this embodiment is additionally formed even on the bottom surface of the nozzle layer 110 like that of the embodiment of FIG. 3.

In other words, the second electrodes 130*b* and 130*a* in this embodiment are formed on both the top surface of the spacing layer 140 and the bottom surface of the nozzle layer 110, thereby inhibiting the electric field interference between the neighboring nozzles 100.

As described above with reference to FIG. 2, the second electrode 130*b* may be formed inside a groove (not shown) recessed downwards on the top surface of the spacing layer 140, or the second electrode 130*a* may be formed inside a groove (not shown) recessed upwards on the bottom surface of the nozzle layer 110. Similarly, the groove formed in the spacing layer 140 or the nozzle layer 110 may be covered with the insulator, i.e., the blocking unit so as to block the second electrode 130*a* or 130*b* from being exposed to the outside.

Figure 6:
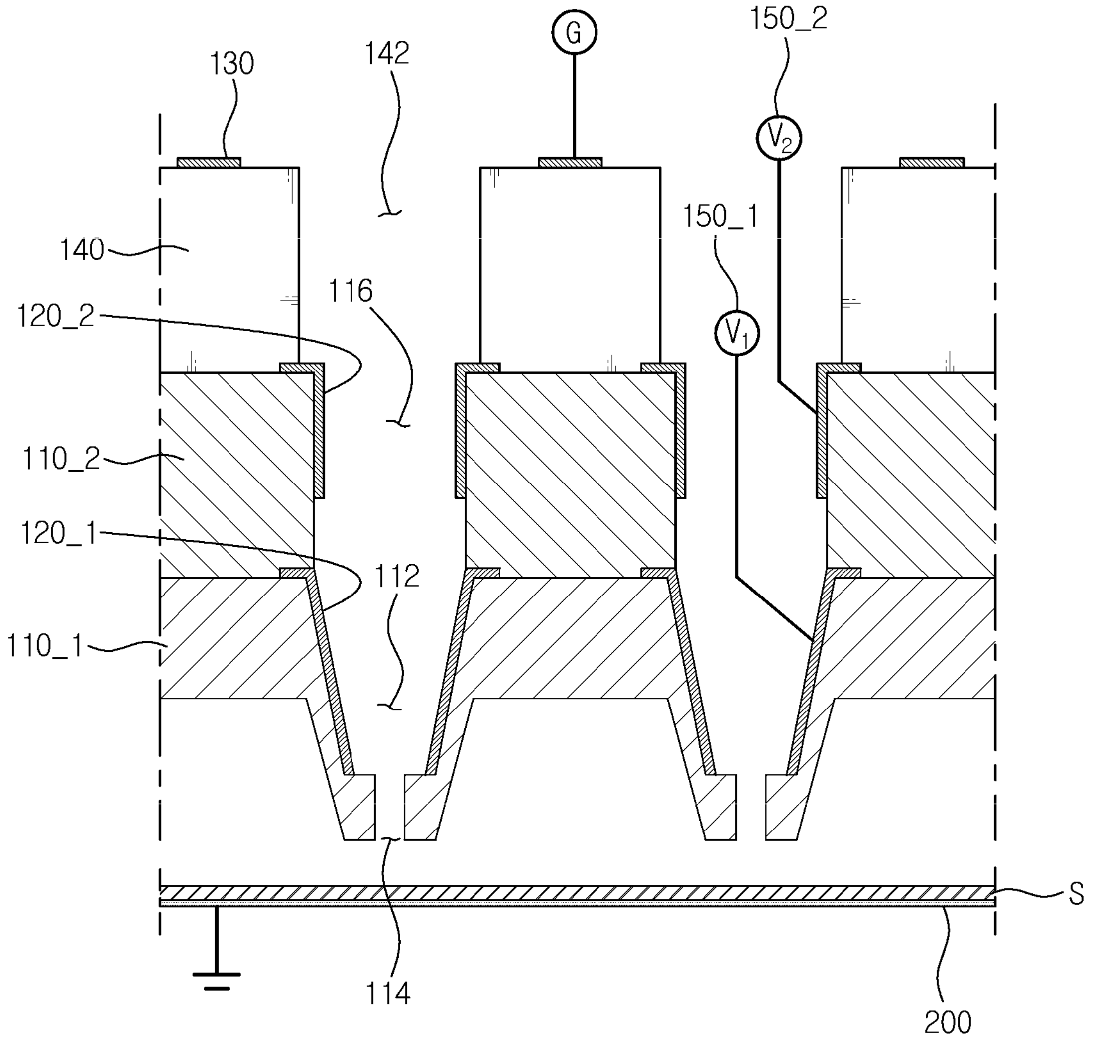
FIG. 6 is a view showing a schematic structure of a printhead according to a sixth embodiment of the disclosure.
Figure 7:
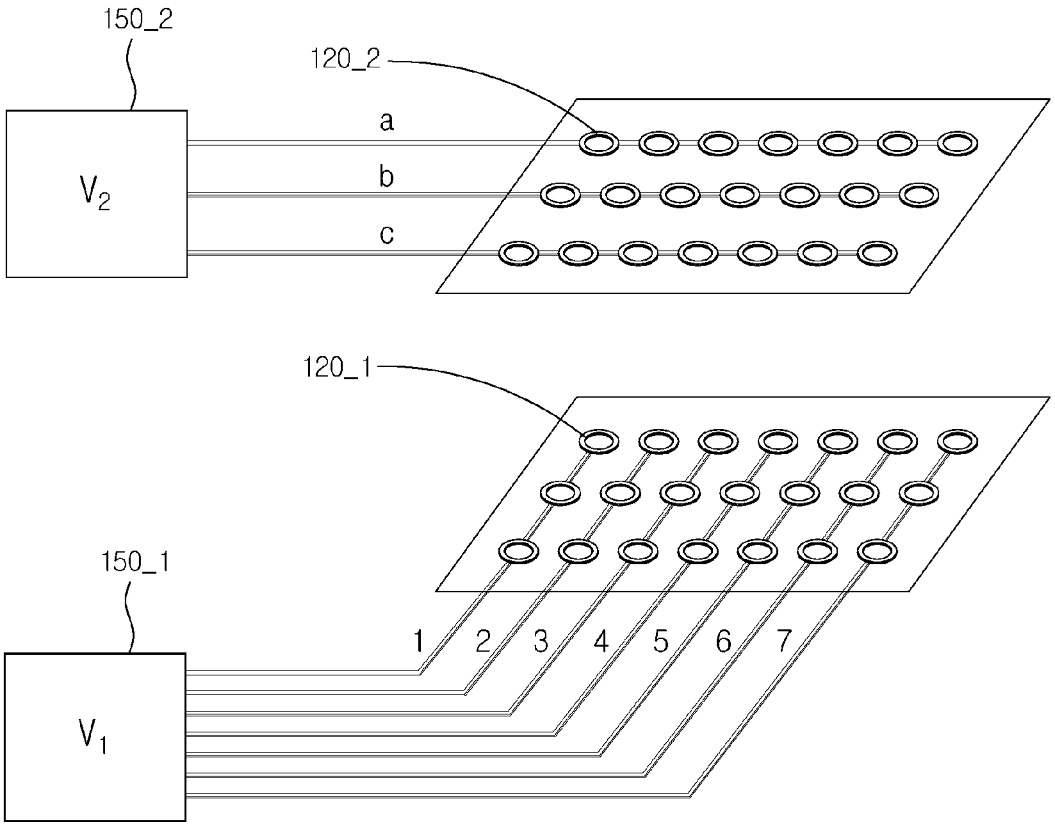
FIG. 7 is a view showing a voltage applying structure of a first electrode and a third electrode in FIG. 6.
Figure 8:
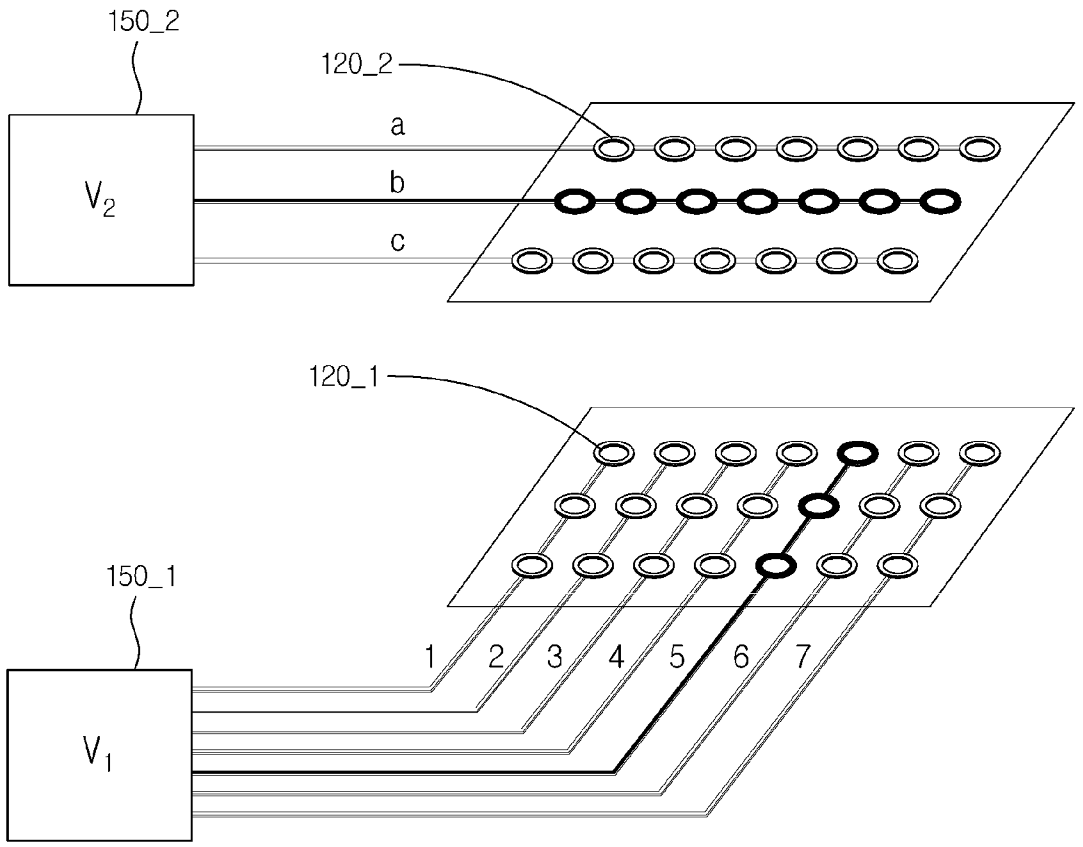
FIG. 8 shows an example of operations in FIG. 7.

FIG. 6 is a view showing a schematic structure of a printhead according to a sixth embodiment of the disclosure, FIG. 7 is a view showing a voltage applying structure of a first electrode and a third electrode in FIG. 6, and FIG. 8 shows an example of operations in FIG. 7.

In this embodiment, the nozzle layer 110 may be divided into a first nozzle layer 110_1 and a second nozzle layer 110_2.

The first nozzle layer 110_1 is placed beneath the second nozzle layer 110_2 while forming the plurality of nozzle chambers 112 to store ink, and each nozzle chamber 112 is formed with the nozzle hole 114 on the bottom thereof to eject a liquid solution. Further, a first electrode 120_1 may be formed on the inner surface of the nozzle chamber 112.

The second nozzle layer 110_2 is formed on the first nozzle layer 110_1 while including a communication chamber 116 penetrated to communicate with the nozzle chamber 112 of the first nozzle layer 110_1, and a third electrode 120_2 formed on the inner surface of the communication chamber 116 and receiving a voltage for ejecting a liquid solution by the electrohydrodynamic method. Alternatively, the first electrode 120_1 and the third electrode 120_2 may be separated and disconnected from each other, such that the first electrode 120_1 is connected to a first voltage controller 150_1 to receive a voltage, and the third electrode 120_2 is connected to a second voltage controller 150_2 to receive a voltage.

Both the first electrode 120_1 and the third electrode 120_2 may be electrodes forming electric fields between the nozzle 100 and the subject S to eject a liquid solution by the electrohydrodynamic method.

Further, the foregoing spacing layer 140 may be formed on the second nozzle layer 110_2. On the top surface of the spacing layer 140, the grounded second electrode 130 is formed to inhibit the electric field interference between the neighboring nozzles 100.

Although not shown, the grounded second electrode 130 may be formed on the top surface of the first nozzle layer 110_1 and separated from the first electrode 120_1, like that shown in FIG. 1. In addition, the grounded second electrode 130 may also be formed on the top surface of the second nozzle layer 110_2 and separated from the third electrode 120_2. Further, although not shown, the grounded second electrode 130 may be formed on the bottom surface of the second nozzle layer 110_2, like that shown in FIG. 3. Furthermore, as described above with reference to FIG. 2, the groove 111 may be formed in the first nozzle layer 110_1 and the second nozzle layer 110_2, and thus the second electrodes 130 may be placed inside the grooves 111.

In this embodiment, the first electrode 120_1 and the third electrode 120_2 to which voltage is applied may be individually synchronized to eject the liquid solution by the electrohydrodynamic method.

As described above, the inkjet printhead according to this embodiment may include the plurality of nozzles 100 arranged in row and column directions while forming a matrix. FIG. 8 shows an exemplary connection structure of the first electrodes 120_1 and the third electrodes 120_2 for the multiple nozzles 100 arranged in the form of three rows and seven columns, but is not limited thereto.

In this case, the plurality of third electrodes 120_2 arranged in single file in either a row or column direction may be electrically connected in the form of a straight line. Referring to FIGS. 7 and 8, seven third electrodes 120_2 are electrically connected in the row direction, and thus three rows a, b and c of third electrodes 120_2 are connected to a second voltage controller 150_2. Further, the plurality of first electrodes 120_1 arranged in single file in either a row or column direction may be electrically connected in the form of a straight line. In this case, the line of the first electrodes 120_1 and the line of the third electrodes 120_2 are perpendicular to each other, in such a manner that the third electrodes 120_2 are electrically connected in the row direction and the first electrodes 120_1 are electrically connected in the column direction. Referring to FIGS. 7 and 8, three first electrodes 120_1 are electrically connected in the column direction, and thus seven columns 1, 2, 3, 4, 5, 6 and 7 are connected to a first voltage controller 150_1.

If the plurality of first electrodes 120_1 and third electrodes 120_2 are individually connected to the first voltage controllers 150_1 and the second voltage controller 150_2, respectively, a voltage connection structure (circuit) may become complicated. The complicated voltage connection structure causes the distance between the nozzles 100 to become longer, and it is thus impossible to compactly arrange the plurality of nozzles 100. Further, if voltages are individually applied to the first electrodes 120_1 and the third electrodes 120_2, it becomes a burden on the capacity of the voltage controller 150. On the other hand, in the plurality of first electrodes 120_1 and third electrodes 120_2 according to this embodiment, the plurality of electrodes arranged in the row or column direction are electrically connected, so that the voltage connection structure can be simplified, thereby reducing the burden on the capacity of the voltage controller 150.

To eject droplets through some nozzles 100 among the plurality of arranged nozzles 100, voltage is applied to lines connected to the first electrodes 120_1 and the third electrodes 120_2 corresponding to those nozzles 100.

For example, as shown in FIG. 8, the lines b and 5 are in an on state, and the other lines a, c, 1, 2, 3, 4, 6 and 7 are in an off state. In this case, only the nozzle 100 corresponding to the intersection between the lines b and 5 ejects the liquid solution. In this way, the first electrode 120_1 and the third electrode 120_2 are electrically connected in the row or column direction in the form of the straight line, and the voltage is selectively applied to each row or each column, thereby selectively allowing the plurality of nozzles 100 to eject the liquid solution.

Figure 9:
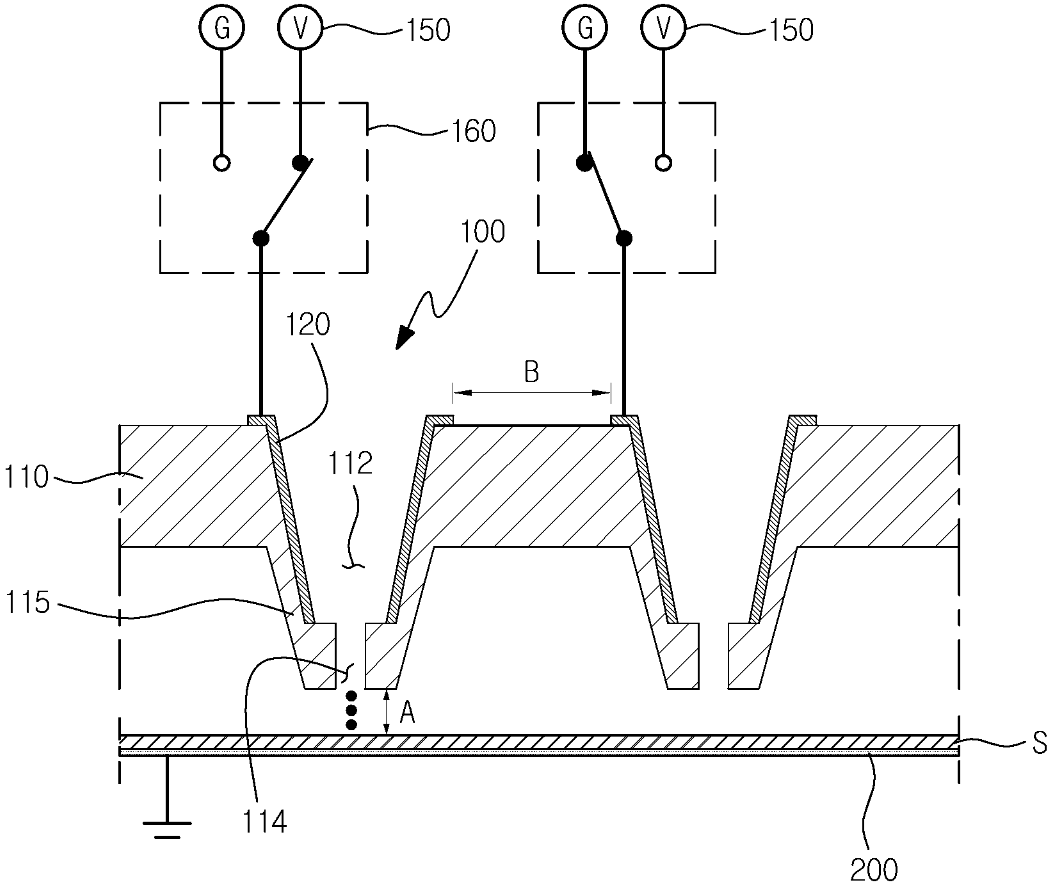
FIG. 9 is a view showing a schematic structure of a printhead according to a seventh embodiment of the disclosure.

FIG. 9 is a view showing a schematic structure of a printhead according to a seventh embodiment of the disclosure.

An inkjet printhead according to the seventh embodiment of the disclosure may include a first electrode 120, a first voltage controller 150, and a controller 160.

Like those of the foregoing embodiments, the inkjet printhead according to this embodiment may include a plurality of nozzles 100, and each nozzle 100 may eject a liquid solution based on electrostatic force by an electrohydrodynamic method.

The plurality of nozzles 100 may be formed in a nozzle layer 110. The nozzle layer 110 has the same configuration as those of the foregoing embodiments, and thus repetitive descriptions thereof will be avoided.

The first electrode 120 is disposed for each of the plurality of nozzles 100, and applied with a voltage for ejecting the liquid solution by the electrohydrodynamic method. Like those of the foregoing embodiments, the first electrode 120 may be formed on an inner surface of the nozzle chamber 112. Further, the first electrode 120 may be coated with an insulating layer.

In this embodiment, the first electrode 120 may be applied with the voltage from the first voltage controller 150 or connected to ground.

The first voltage controller 150 applies the voltage to the first electrode 120 so as to eject the liquid solution by the electrohydrodynamic method.

The controller 160 may control the first electrode 120 to be connected to ground or be applied with the voltage from the first voltage controller 150. As shown in FIG. 9, the controller 160 may control a switch formed between the first electrode 120 and the first voltage controller 150, thereby controlling the first electrode 120 to be electrically connected to the first voltage controller 150 or connected to ground through the switch.

According to this embodiment, when the liquid solution is ejected selectively from among the plurality of nozzles 100, the controller 160 may control the first electrode 120 of the nozzle 100, which is selected to eject the liquid solution, to be connected to the first voltage controller 150 and applied with the voltage from the first voltage controller, and control the first electrode 120 of the nozzle, which is adjacent to the nozzle selected to eject the liquid solution and is selected not to eject the liquid solution, to be connected to ground. Referring to FIG. 9, the controller 160 connects the first electrode 120 of the left nozzle 100 to the first voltage controller 150 and connects the first electrode 120 of the right nozzle 100 to ground, thereby controlling only the left nozzle 100 to eject the liquid solution by the electrohydrodynamic method.

Unlike the foregoing embodiments, the grounded second electrode 130 is not present in this embodiment. Instead, according to this embodiment, the first electrode 120 of the nozzle 100, which is adjacent to the nozzle 100 selected to eject the liquid solution and is selected not to eject the liquid solution, is grounded to minimize electric field interference between the nozzles 100.

In this case, the controller 160 may also control not only the nozzle 100 adjacent to the nozzle 100 selected to eject the liquid solution but also all the other nozzles 100, which are selected not to eject the liquid solution, to have the first electrodes 120 connected to ground.

In this case, as shown in FIG. 9, a distance B between the first electrodes 120 of the neighboring nozzles 100 may be greater than a distance A between the bottom of the nozzle 100 and a subject S. In this way, the electric field interference between the neighboring nozzles 100 is minimized, and it is thus possible to individually control each nozzle 100 to eject the liquid solution.

Because the distance B between the first electrodes 120 of the neighboring nozzles 100 is a fixed value given when manufactured, printing may be performed while controlling the distance A between the bottom of the nozzle 100 and the subject S within a range of values smaller than B when the inkjet printhead according to this embodiment is used.

As described above, the inkjet printhead according to the disclosure has advantages of minimizing the electric field interference between the neighboring nozzles while ejecting the droplets through the multiple nozzles by the electrohydrodynamic method, thereby ejecting the droplets uniformly with easy control.

Further, it is advantageous to eject the droplets with individual control for each nozzle.

Although detailed embodiments of a fluidic lens with a variable focal length according to the disclosure have been described, the disclosure is not limited to such detailed embodiments. Various changes and modifications can be made by a person having ordinary knowledge in the art without departing from the spirit and scope of the invention defined in the appended claims.

REFERENCE NUMERALS

100: nozzle
110: nozzle layer
111: groove
112: nozzle chamber
114: nozzle hole
115: protruding portion
116: communication chamber
119: blocking unit
120: first electrode
130: second electrode
140: spacing layer
150: first voltage controller
160: controller
200: ground electrode

What is claimed is:

1. An inkjet printhead with a plurality of nozzles to eject a liquid solution by an electrohydrodynamic method, the inkjet printhead comprising:
- a first electrode formed for each of the plurality of nozzles, and applied with a voltage for ejecting the liquid solution by the electrohydrodynamic method;
- a first voltage controller configured to apply the voltage to the first electrode;
- a second electrode placed between and spaced apart from the first electrodes formed in the nozzles and grounded to inhibit electric field interference between the nozzles; and
- a nozzle layer formed with a plurality of nozzle chambers to store ink supplied for each nozzle and a nozzle hole on a bottom of the nozzle chamber to eject a liquid solution,
- wherein each second electrode is individually formed between adjacent first electrodes, and
- wherein a groove is recessed downwards on a top surface of the nozzle layer, and the second electrode is formed inside the groove.

2. The inkjet printhead of claim 1, further comprising a blocking unit formed of an insulator and covering the groove to block the second electrode from being exposed to an outside of the groove.

3. An inkjet printhead with a plurality of nozzles to eject a liquid solution by an electrohydrodynamic method, the inkjet printhead comprising:
- a first electrode formed for each of the plurality of nozzles, and applied with a voltage for ejecting the liquid solution by the electrohydrodynamic method;
- a first voltage controller configured to apply the voltage to the first electrode;
- a second electrode placed between and spaced apart from the first electrodes formed in the nozzles and grounded to inhibit electric field interference between the nozzles; and
- a nozzle layer formed with a plurality of nozzle chambers to store ink supplied for each nozzle and a nozzle hole on a bottom of the nozzle chamber to eject a liquid solution,
- wherein each second electrode is individually formed between adjacent first electrodes,
- wherein the first electrode is formed on an inner surface of the nozzle chamber, and the second electrode is formed on a bottom surface of the nozzle layer, and
- wherein a bottom of the nozzle layer protrudes to form a protruding portion for each nozzle, a nozzle hole is formed at a bottom of the protruding portion, and the second electrode is formed on a recessed portion between the protruding portions.

4. An inkjet printhead with a plurality of nozzles to eject a liquid solution by an electrohydrodynamic method, the inkjet printhead comprising:

a first electrode formed for each of the plurality of nozzles, and applied with a voltage for ejecting the liquid solution by the electrohydrodynamic method;

a first voltage controller configured to apply the voltage to the first electrode;

a second electrode placed between and spaced apart from the first electrodes formed in the nozzles and grounded to inhibit electric field interference between the nozzles; and a nozzle layer formed with a plurality of nozzle chambers to store ink supplied for each nozzle and a nozzle hole on a bottom of the nozzle chamber to eject a liquid solution, wherein each second electrode is individually formed between adjacent first electrodes, and wherein a groove is recessed upwards on a bottom surface of the nozzle layer, and the second electrode is formed inside the groove.

5. The inkjet printhead of claim 4, further comprising a blocking unit formed of an insulator and covering the groove to block the second electrode from being exposed to an outside of the groove.

6. An inkjet printhead with a plurality of nozzles to eject a liquid solution by an electrohydrodynamic method, the inkjet printhead comprising:

a first electrode formed for each of the plurality of nozzles, and applied with a voltage for ejecting the liquid solution by the electrohydrodynamic method;

a first voltage controller configured to apply the voltage to the first electrode;

a second electrode placed between and spaced apart from the first electrodes formed in the nozzles and grounded to inhibit electric field interference between the nozzles;

a nozzle layer formed with a plurality of nozzle chambers to store ink supplied for each nozzle and a nozzle hole on a bottom of the nozzle chamber to eject a liquid solution; and a spacing layer placed on the nozzle layer and formed with a channel penetrated to communicate with the nozzle chamber, wherein each second electrode is individually formed between adjacent first electrodes, and wherein a groove is recessed downwards on a top surface of the spacing layer, and the second electrode is formed inside the groove.

7. The inkjet printhead of claim 6, further comprising a blocking unit formed of an insulator and covering the groove to block the second electrode from being exposed to an outside of the groove.

8. An inkjet printhead with a plurality of nozzles to eject a liquid solution by an electrohydrodynamic method, the inkjet printhead comprising:

a first electrode formed for each of the plurality of nozzles, and applied with a voltage for ejecting the liquid solution by the electrohydrodynamic method;

a first voltage controller configured to apply the voltage to the first electrode;

a second electrode placed between and spaced apart from the first electrodes formed in the nozzles and grounded to inhibit electric field interference between the nozzles; and a nozzle layer formed with a plurality of nozzle chambers to store ink supplied for each nozzle and a nozzle hole on a bottom of the nozzle chamber to eject a liquid solution, wherein each second electrode is individually formed between adjacent first electrodes, wherein the first electrode is formed on an inner surface of the nozzle chamber, and the second electrode is formed on a top surface of the nozzle layer, and wherein the nozzle layer comprises:

a first nozzle layer formed with a plurality of nozzle chambers to store ink supplied for each nozzle and a nozzle hole on a bottom of the nozzle chamber to eject a liquid solution, and comprising the first electrode formed on an inner surface of the nozzle chamber; and a second nozzle layer formed on the first nozzle layer, formed with a plurality of communication chambers communicating with the nozzle chambers, and comprising a third electrode formed on an inner surface of the communication chamber and receiving a voltage for ejecting a liquid solution by an electrohydrodynamic method.

9. The inkjet printhead of claim 8, wherein a plurality of nozzles are arranged in a matrix form, the first electrodes arranged in one direction between a row direction and a column direction are electrically connected, and the first voltage controller selectively and simultaneously applies voltage to the first electrodes arranged in the one direction, and the third electrodes arranged in the other direction between the row direction and the column direction are electrically connected, and the second voltage controller selectively and simultaneously applies voltage to the first electrodes arranged in the other direction.

* * * * *